US008600354B2

(12) United States Patent
Esaki (10) Patent No.: US 8,600,354 B2
(45) Date of Patent: Dec. 3, 2013

(54) PORTABLE ELECTRONIC DEVICE

(75) Inventor: Michitada Esaki, Yokohama (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 13/126,949

(22) PCT Filed: Oct. 29, 2009

(86) PCT No.: PCT/JP2009/068629
§ 371 (c)(1),
(2), (4) Date: Apr. 29, 2011

(87) PCT Pub. No.: WO2010/050573
PCT Pub. Date: May 6, 2010

(65) Prior Publication Data
US 2011/0212753 A1    Sep. 1, 2011

(30) Foreign Application Priority Data

Oct. 29, 2008    (JP) .................................. 2008-277882

(51) Int. Cl.
*H04W 88/02*    (2009.01)
(52) U.S. Cl.
USPC ........................................ 455/411; 455/556.1
(58) Field of Classification Search
USPC ................. 455/411, 556.1, 567, 454, 462.01, 455/462.32, 462.45, 470; 340/815.45
See application file for complete search history.

(56) References Cited

U.S. PATENT DOCUMENTS

| 7,978,092 | B2 * | 7/2011 | Osaka ........................... 340/687 |
| 8,231,231 | B2 | 7/2012 | Okuda et al. |
| 2002/0025784 | A1 | 2/2002 | Horiguchi |

| 2006/0121886 | A1 | 6/2006 | Maehara et al. |
| 2008/0177921 | A1 | 7/2008 | Matsunagi et al. |
| 2008/0203936 | A1 * | 8/2008 | Mariyama et al. ............ 315/246 |
| 2009/0036158 | A1 | 2/2009 | Fujinawa et al. |
| 2009/0195861 | A1 * | 8/2009 | Jendbro et al. ................ 359/315 |

(Continued)

FOREIGN PATENT DOCUMENTS

| JP | 2002-141986 A | 5/2002 |
| JP | 2004-221937 A | 8/2004 |

(Continued)

OTHER PUBLICATIONS

ISR for PCT/JP/2009/068629 mailed Dec. 15, 2009.

(Continued)

*Primary Examiner* — Diane Mizrahi
(74) *Attorney, Agent, or Firm* — Lowe Hauptman & Ham, LLP (57) ABSTRACT

An object of the present invention is to suppress, in a portable electronic device that can emit light, a situation in which light is emitted in an unexpected direction when a user suddenly moves the portable electronic device while a light emission operation is being performed. In order to achieve the above object, a mobile telephone includes a light emission unit that emits laser light or the like; a main display unit, a vibration motor, an LED, a speaker, and a sub display unit that perform a predetermined notification when a predetermined condition is satisfied; and a control unit that controls a light emission operation performed by the light emission unit, the control unit including a suppression unit that suppresses a predetermined notification performed by the main display unit, the vibration motor, the LED, the speaker, and the sub display unit when the light emission unit emits light.

19 Claims, 6 Drawing Sheets

(56) References Cited

U.S. PATENT DOCUMENTS

| | | |
|---|---|---|
| 2010/0060618 A1 | 3/2010 | Okuda et al. |
| 2010/0141176 A1* | 6/2010 | Matsushita .................. 315/294 |
| 2011/0128166 A1* | 6/2011 | Kagami .......................... 341/22 |

FOREIGN PATENT DOCUMENTS

| JP | 2005-184263 A | 7/2005 |
|---|---|---|
| JP | 2006-140759 A | 6/2006 |
| JP | 2006-311098 A | 11/2006 |
| JP | 2007-74652 A | 3/2007 |
| JP | 2007228551 A | 9/2007 |
| JP | 2008-053960 A | 3/2008 |
| JP | 2008109436 | 5/2008 |
| JP | 2008-129219 A | 6/2008 |
| JP | 2008-177810 A | 7/2008 |
| JP | 2009003428 | 1/2009 |

OTHER PUBLICATIONS

Japanese Office Action for Application No. 2010-535845 mailed Aug. 14, 2012.

Japanese Office action issued in application No. 2010-535842 mailed Nov. 20, 2012.

Japanese Office Action for Application No. 2010-535842 mailed Aug. 14, 2012.

Japanese Office Action for Application No. 2010-535842 mailed Sep. 24, 2013.

\* cited by examiner

PORTABLE ELECTRONIC DEVICE

RELATED APPLICATIONS

The present application is National Phase of PCT/JP2009/068629, filed Oct. 29, 2009, and claims priority from Japanese Application Number 2008-277882, filed Oct. 29, 2008.

TECHNICAL FIELD

The present invention relates to a portable electronic device which can emit light.

BACKGROUND ART

In a presentation, when a presenter gives a presentation while displaying a presentation material on a screen through a projector, in order to make the audience easily understand, in most cases, a part corresponding to the content of the presentation material that is being explained is pointed out using a light emission unit that can emit light such as a laser pointer. Patent Literature 1 discloses a portable electronic device including the light emission unit described above.

CITATION LIST

Patent Literature

Patent Literature Japanese Patent Application Laid-Open No. 2008-129219

DISCLOSURE OF INVENTION

Problems to be Solved by the Invention

However, in the portable electronic device disclosed in Patent Literature 1, it is supposed that while a light emission operation is being performed, if a predetermined condition is satisfied, notification to a user is performed, so that the user may notice the notification and suddenly move the portable electronic device, and thus there is a concern that light may be emitted in an unexpected direction.

The present invention is made in light of the above described problem, and an object thereof is to provide a portable electronic device that allows notification to be suppressed when a light emission operation is being performed, thereby suppressing a situation in which light is emitted in an unexpected direction.

Means for Solving Problem

In order to solve the above-described problem, a portable electronic device according to an exemplary embodiment of the present invention comprises: a light emission unit that emits light; a notification unit that performs a predetermined notification; and a control unit that controls a light emission operation performed by the light emission unit, and a notification operation performed by the notification unit, according to a predetermined condition. The control unit suppresses the predetermined notification when the light emission unit is emitting light.

Preferably, the portable electronic device further comprises: a communication unit. When the light emission operation by the light emission unit is being controlled, if it is determined that a call is received by the communication unit, the control unit suppresses the predetermined notification performed by the notification unit.

Preferably, when the light emission operation by the light emission unit is being controlled, if it is determined that a call received by the communication unit is from a correspondent other than a specific correspondent, the control unit suppresses the predetermined notification performed by the notification unit.

Preferably, when the light emission operation by the light emission unit is being controlled, if it is determined that a specific signal is not included in a call received by the communication unit, the control unit suppresses the predetermined notification performed by the notification unit.

Preferably, the portable electronic device further comprises: an alarm operation unit. When the light emission operation by the light emission unit is being controlled, if it is determined that an alarm operation has been performed by the alarm operation unit, the control unit suppresses the predetermined notification performed by the notification unit.

Preferably, when the light emission operation by the light emission unit is being controlled, if it is determined that an alarm operation other than a specific alarm operation has been performed by the alarm operation unit, the control unit suppresses the predetermined notification performed by the notification unit.

Preferably, the portable electronic device further comprises: a storage unit. When the predetermined notification is suppressed, the control unit stores, in the storage unit, information related to a case where the predetermined condition that is the basis of the notification has been satisfied.

Preferably, when the light emission operation by the light emission unit has been suppressed, if there is stored, in the storage unit, the information related to a case where the predetermined condition has been satisfied, the control unit allows the notification unit to perform the predetermined notification.

Preferably, the portable electronic device further comprises: a case; and a case state detection unit that detects a state of the case. When the light emission operation by the light emission unit is being controlled, if the case state detection unit determines that the state of the case is a predetermined state, the control unit suppresses the predetermined notification performed by the notification unit.

A portable electronic device according to another aspect of the present invention comprises: a light emission unit that emits light; a communication unit; and a control unit that controls a light emission operation performed by the light emission unit and a communication operation performed by the communication unit. The control unit suppresses the communication operation performed by the communication unit when the light emission operation by the light emission unit is being controlled.

Effect of the Invention

According to the present invention, since notification by a notification unit is suppressed when a light emission operation is being performed, a situation in which light is emitted in an unexpected direction can be suppressed.

DESCRIPTION OF EMBODIMENTS

Hereinafter, best modes for realizing the present invention will be described with reference to the accompanying drawings. In a first embodiment and a second embodiment described below, a portable electronic device according to the present invention is a mobile telephone 1 with a laser pointer function.

Figure 1:
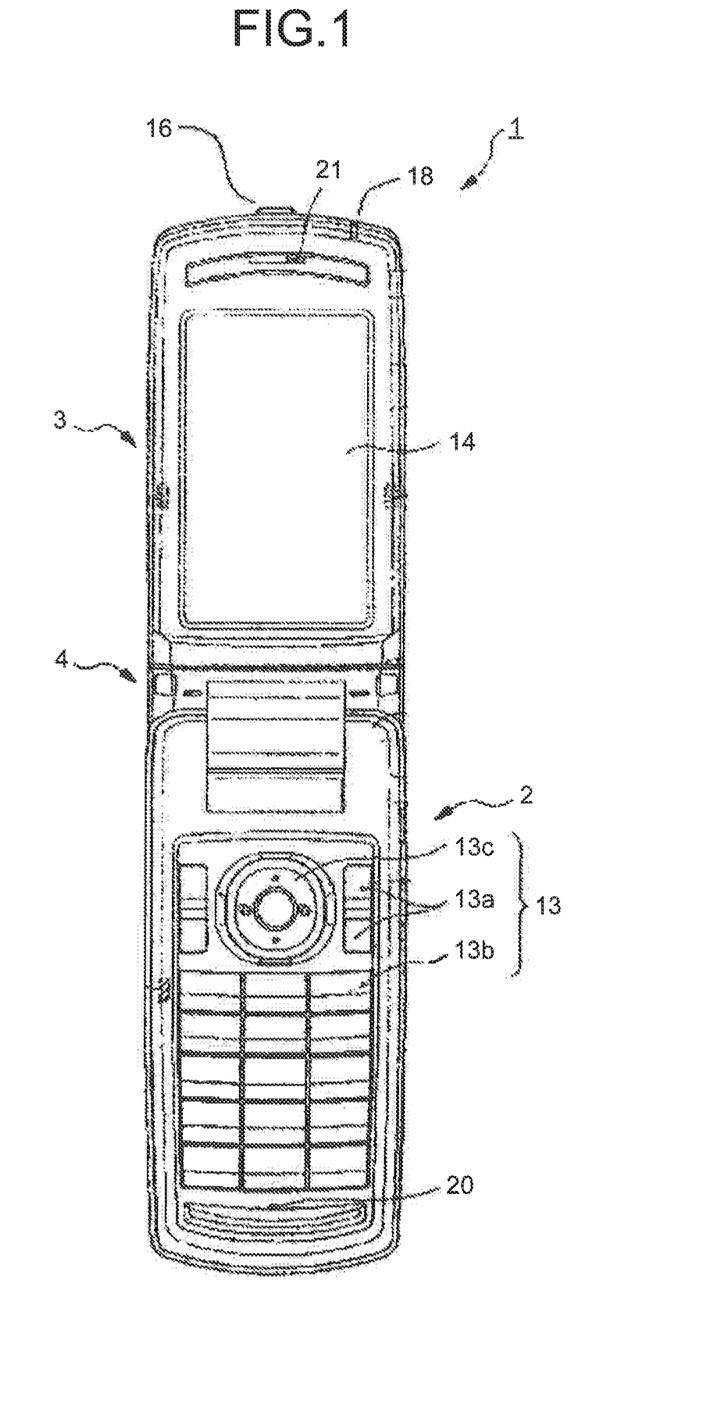
FIG. 1 is an exterior front view illustrating a state in which a mobile telephone is opened.
Figure 2:
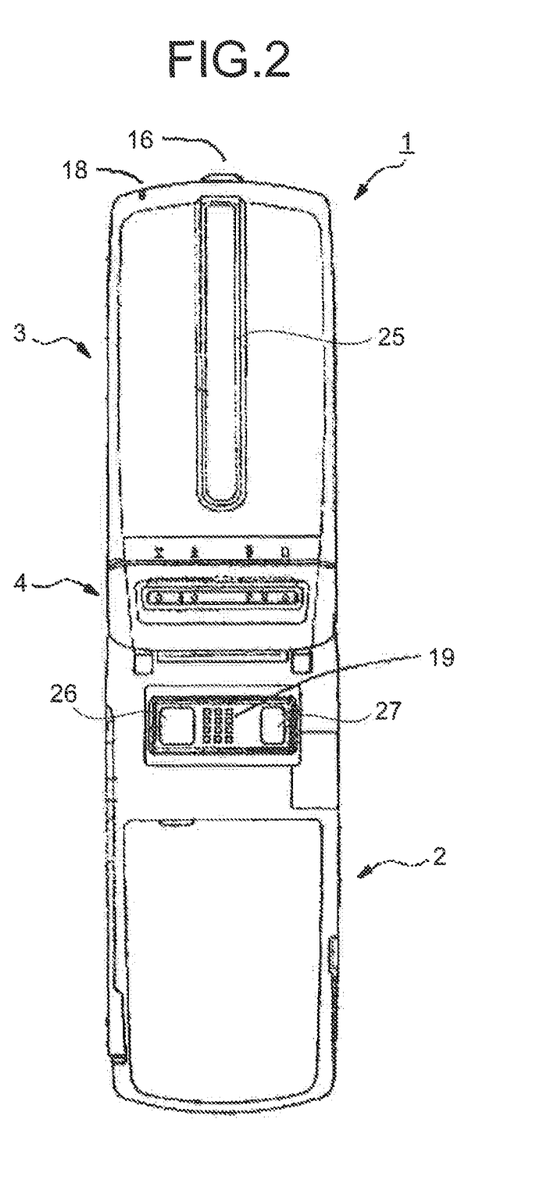
FIG. 2 is an exterior rear view illustrating a state in which a mobile telephone is opened.

A basic structure of the mobile telephone 1 according to the first and second embodiments will be described with reference to FIG. 1 and FIG. 2. FIG. 1 is an exterior front view illustrating a state in which the mobile telephone 1 is opened. FIG. 2 is an exterior rear view illustrating a state in which the mobile telephone 1 is opened.

As illustrated in FIG. 1, the mobile telephone 1 includes an operation unit side case 2 and a display unit side case 3. The operation unit side case 2 and the display unit side case 3 are connected through a connection unit 4 with a hinge mechanism and configured to be movable between an open state and a close state. The operation unit side case 2 includes an operation unit 13 that has a plurality of keys and a voice input unit 20 that is disposed at an end section of a side opposite to a side at which the connection unit 4 is installed. The display unit side case 3 includes a main display unit 14, and a light emission unit 16 and a voice output unit 21 that are disposed at an end section of a side opposite to a side at which the connection section 4 is installed.

Further, as illustrated in FIG. 2, a speaker 19, a sub display unit 25, a camera 26, and a camera light 27 are installed on a back side of the operation unit side case 2.

Figure 3:
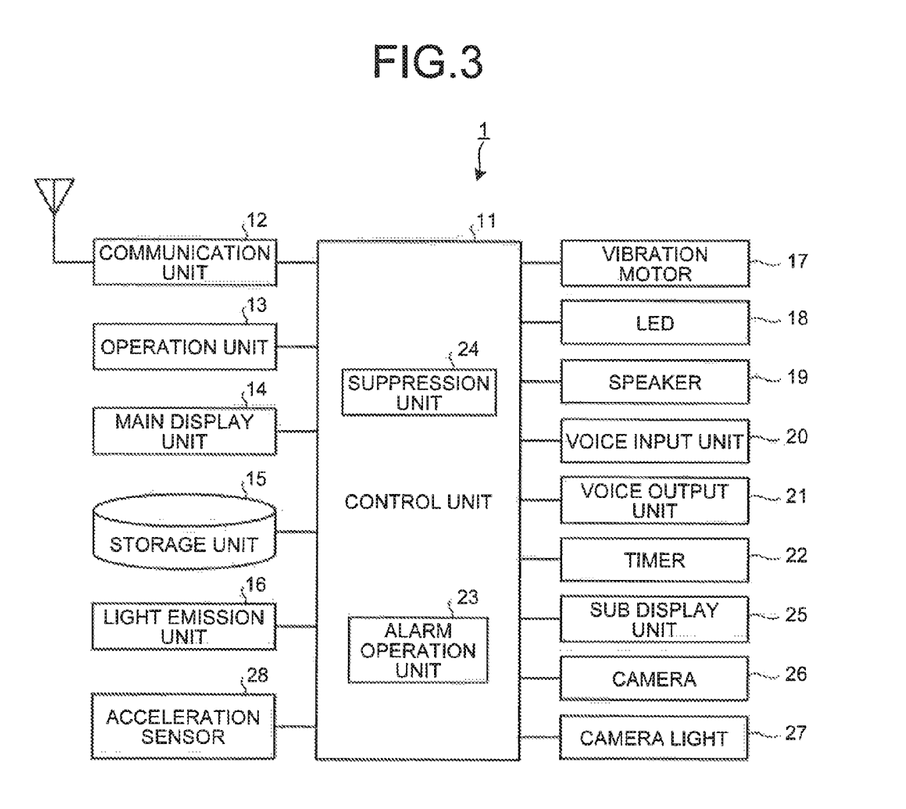
FIG. 3 is a block diagram illustrating basic components of a mobile telephone.

FIG. 3 is a block diagram illustrating basic components of the mobile telephone 1. As illustrated in FIG. 3, the mobile telephone 1 is configured to include a control unit 11, a communication unit 12, an operation unit 13, a main display unit 14, a storage unit 15, a light emission unit 16, a vibration motor 17, a light emitting diode (LED) 18, a speaker 19, a voice input unit 20, a voice output unit 21, a timer 22, a sub display unit 25, a camera 26, a camera light 27, and an acceleration sensor 28.

The communication unit 12 receives a signal from a reception side of a baseband unit and demodulates the signal into a reception baseband signal. The communication unit 12 encodes voice data input from the voice input unit 20 into a transmission baseband signal, and transmits the transmission baseband signal. Further, the communication unit 12 performs communications such as transmission and reception of a mail, a connection to the Internet, and reception of a GPS (Global Positioning System) signal.

The operation unit 13 includes a function setting operation key 13a for operating various settings or various functions such as a telephone book function or a mail function, an operation input key 13b for inputting a digit of a telephone number, a character for a mail, or the like, and a decision operation key 13c for performing a decision in various operations or scrolling in an up, down, left, or right direction. A predetermined operation content is assigned to each of the keys that configure the operation unit 13 according to an open/close state of the operation unit side case 2 and the display unit side case 3, various modes, or a kind of an activated application or the like (key assignment). When a user presses each key down, an operation according to an operation content assigned to each key is executed.

The main display unit 14 (one of notification units) and the sub display unit 25 (one of the notification units) are display devices that are configured with a liquid crystal, an organic EL (Electro Luminescence), or the like and performs notification by displaying various information related to the mobile telephone 1.

The storage unit 15 is a storage device that stores various information related to the mobile telephone 1 and stores a telephone book, an address book, photography data, music data, programs for implementing the first and second embodiments according to flowcharts illustrated in FIGS. 4 and 5 which will be described later, and the like. Further, the storage unit 15 stores a threshold value of a detection value of the acceleration sensor 28 which will be described later.

The light emission unit 16 is configured to be capable of emitting laser light. The decision operation key 13c in the operation unit 13 is used as a laser light emission operation key that instructs the light emission unit 16 to emit laser light when the mobile telephone 1 functions as the laser pointer.

The vibration motor 17 (one of the notification units) performs notification by generating predetermined vibration through a vibrator.

The LED (Light Emitting Diode) 18 (one of the notification units) performs notification by generating predetermined light.

The speaker 19 (one of the notification units) performs notification by converting an electrical signal into vibration and generating a predetermined sound.

The voice input unit 20 converts a sound into a signal that can be transmitted through the communication unit 12. The voice output unit 21 converts a signal received by the communication unit 12 into a sound and outputs the sound.

The timer 22 can measure a predetermined time and inform the user of the elapse of time.

The camera 26 can take a picture of the surroundings. The camera light 27 can emit predetermined light in a direction in which the camera 26 faces.

The acceleration sensor 28 (a case state detection unit) is a detector that detects acceleration applied to the operation unit side case 2 or the display unit side case 3. The acceleration sensor 28 converts a value of detected acceleration into a signal and outputs the signal to the control unit 11. For example, as the acceleration sensor 28, a detector that detects acceleration through a change in capacitance, a change in piezoresistance, a change in relative position, or the like is used.

The control unit 11 controls an operation of each component of the mobile telephone 1 according to the program stored in the storage unit 15. For example, when a communication operation is performed by the communication unit 12, a signal for instructing notification of information related to the communication operation is transmitted to the main display unit 14, the vibration motor 17, the LED 18, the speaker 19, and the sub display unit 25. The control unit 11 is configured to include an alarm operation unit 23 and a suppression unit 24. The alarm operation unit 23 draws the user's attention through the main display unit 14, the vibration motor 17, the LED 18, the speaker 19, and the sub display unit 25. Specifically, the alarm operation unit 23 transmits a signal for instructing notification of information related to an alarm operation to the main display unit 14, the vibration motor 17, the LED 18, the speaker 19, and the sub display unit 25.

The control unit 11 compares the acceleration detected by the acceleration sensor 28 with the threshold value stored in the storage unit 15, determines that the mobile telephone 1 remains stationary when the detected acceleration is less than the threshold value, and determines that the mobile telephone 1 does not remain stationary (is moving) when the detected acceleration is larger than the threshold value.

A predetermined condition for performing the notification operation refers to when the main display unit 14, the vibration motor 17, the LED 18, the speaker 19, and the sub display unit 25 receive a signal for instructing the notification of information related to the communication operation or the alarm operation from the control unit 11 or the alarm operation unit 23. When the signal for instructing notification is received, the main display unit 14 and the sub display unit 25 perform notification by displaying a character or an image on their screens. The vibration motor 17 performs notification by generating predetermined vibration. The LED 18 performs notification by generating predetermined light. The speaker 19 performs notification by generating a predetermined sound.

The suppression unit 24 suppresses notification, based on the predetermined condition, by the main display unit 14, the vibration motor 17, the LED 18, the speaker 19, and the sub display unit 25 when the laser light emission operation by the light emission unit 16 is being performed by the control unit 11. Specifically, when the respective notification units are performing their operations, the suppression unit 24 transmits a signal for stopping emission of back light to the main display unit 14 and the sub display unit 25, a signal for stopping generation of predetermined vibration to the vibration motor 17, a signal for stopping generation of predetermined light to the LED 18, and a signal for stopping generation of a predetermined sound to the speaker 19, respectively. Meanwhile, when the respective notification units do not perform their operations, the suppression unit 24 transmits a signal for instructing continuously not to perform emission of back light to the main display unit 14 and the sub display unit 25, a signal for instructing continuously not to perform generation of predetermined vibration to the vibration motor 17, a signal for instructing continuously not to perform generation of predetermined light to the LED 18, and a signal for instructing continuously not to perform generation of a predetermined sound to the speaker 19, respectively.

The control unit 11 can release suppression of notification by the suppression unit 24. Specifically, the control unit 11 releases suppression of notification by stopping the transmitting of the signals for instructing continuously not to perform their operations to the respective notification units.

In the first embodiment, the mobile telephone 1 according to the present invention is configured to suppress notification through the main display unit 14, the vibration motor 17, the LED 18, the speaker 19, and the sub display unit 25 by using the suppression unit 24 when the laser light emission operation by the light emission unit 16 is being performed by the control unit 11. As a result, it is possible to suppress the situation in which light is emitted in an unexpected direction when the user notices the notification such as a call reception or a mail reception and suddenly moves the mobile telephone 1. A specific operation will be described below with reference to FIG. 4.

Figure 4:
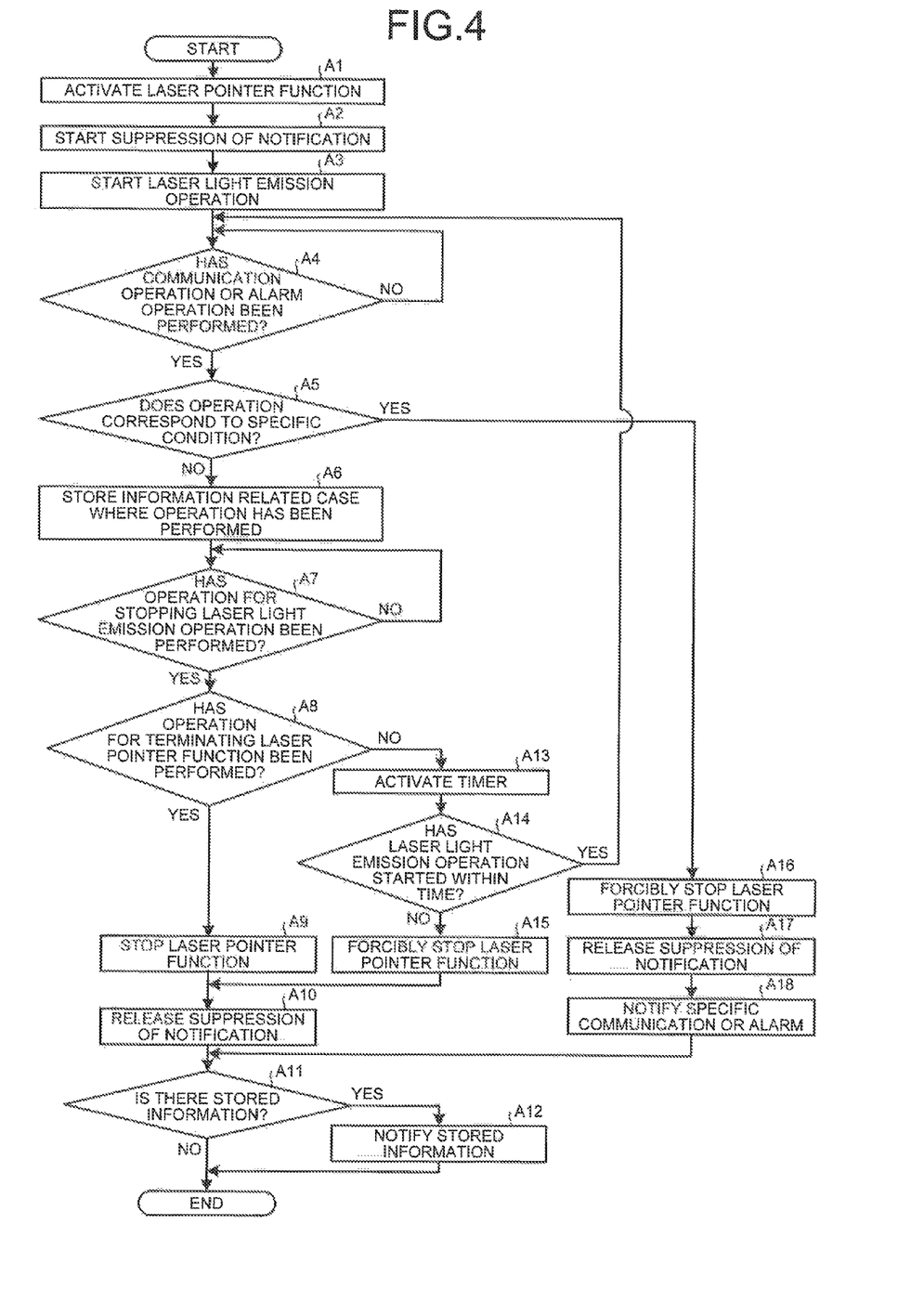
FIG. 4 is a flowchart showing an operation example according to a first embodiment of the present invention.
Figure 5:
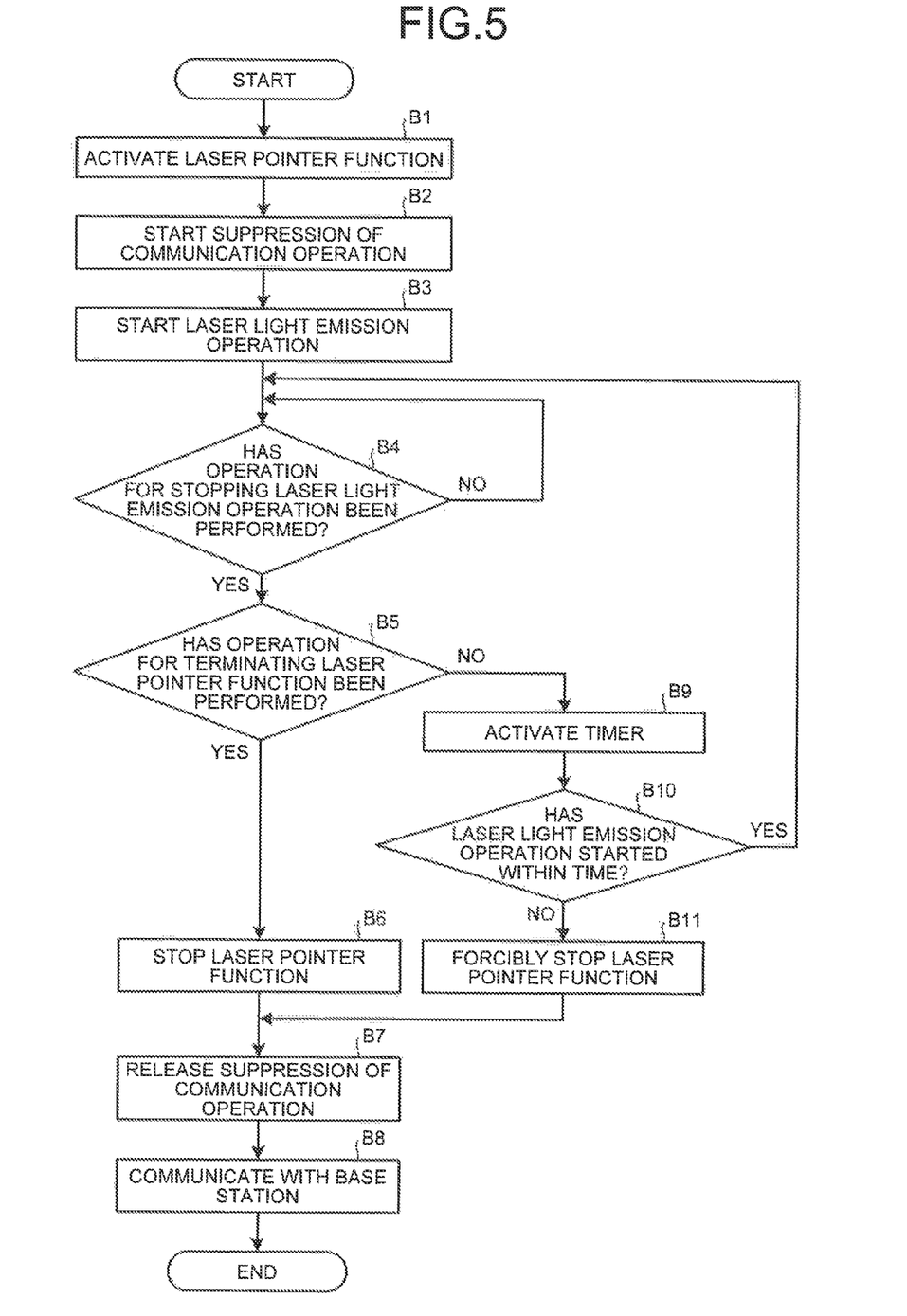
FIG. 5 is a flowchart showing an operation example according to a second embodiment of the present invention.

FIG. 4 is a flowchart for explaining an operation example according to the first embodiment of the present invention. First, when the control unit 11 detects that the user has performed an operation for activating the laser pointer function on the operation unit 13, the control unit 11 activates the laser pointer function that enables the laser light emission operation by the light emission unit 16 (step A1). The suppression unit 24 suppresses notification by the main display unit 14, the vibration motor 17, the LED 18, the speaker 19, and the sub display unit 25 (step A2). Then, when the control unit 11 detects that the user has performed an operation for starting the laser light emission operation on the operation unit 13, the control unit 11 starts the laser light emission operation (step A3).

In step S4, the control unit 11 determines whether or not the communication operation by the communication unit 12 or the alarm operation by the alarm operation unit 23 has been performed by the main display unit 14, the vibration motor 17, the LED 18, the speaker 19, and the sub display unit 25, based on the transmitted signal for instructing notification. When it is determined that the communication operation or the alarm operation has been performed (Yes in step S4), the control unit 11 determines whether or not the communication operation or the alarm operation corresponds to a specific condition which will be described later (step A5). Meanwhile, when it is determined that the communication operation or the alarm operation has not been performed (No in step S4), the process returns to step A4, and step A4 is repeated.

Here, a case that corresponds to the specific condition refers to, for example, a case in which the communication unit 12 receives a call from a specific telephone number that is selected from data of the address book inside the storage unit 15 and previously stored in the storage unit 15 by the user, a case in which the control unit 11 determines that a specific character (signal) such as "urgent" or "confirmation required" is included in the title or the text of a received mail, or a case in which the alarm operation that the user has previously stored as an operation to be performed in priority to suppression of notification in the storage unit 15 has been performed.

When the control unit 11 determines that the communication operation or the alarm operation does not correspond to the specific condition when a call is received from a correspondent other than a specific correspondent, when a specific signal is not included in a received call, or when an alarm operation other than a specific alarm operation is performed) (No in step A5), there is stored, in the storage unit 15, information related to the case where the communication operation or the alarm operation that is the basis of notification has been performed (step A6). Thereafter, the control unit 11 determines whether or not the user has performed an operation for stopping the laser light emission operation on the operation unit 13 (step A7). When it is determined that the operation for stopping the laser light emission operation has not been performed (No in step A7), the process returns to step A7, and step A7 is repeated.

Meanwhile, when it is determined that the operation for stopping the laser light emission operation has been performed (Yes in step A7), the control unit 11 determines whether or not the user has performed an operation for terminating the laser pointer function on the operation unit 13 (step A8). When it is determined that the operation for terminating the laser pointer function has been performed (Yes in step A8), the control unit 11 terminates the laser pointer function (step A9). Then, the control unit 11 releases suppression of notification (step A10).

Thereafter, the control unit 11 determines whether or not there is stored, in the storage unit 15, information which represents that the communication operation or the alarm operation that does not correspond to the specific condition has been performed (step A11). In the case of the flow so far, since there is stored, in the storage unit 15 in step A5, information which relates to the case where the communication operation or the alarm operation has been performed, the control unit 11 determines that there is stored information (Yes in step A11), and notification of the stored information is performed by the main display unit 14, the vibration motor 17, the LED 18, the speaker 19, and the sub display unit 25 (step A12).

Here, after the control unit 11 determines that the user has performed the operation for stopping the laser light emission operation on the operation unit 13 (Yes in step A7), when the control unit 11 determines that the user has not performed the operation for terminating the laser pointer function on the operation unit 13 (No in step A8), the control unit 11 activates the timer 22 (step A13). The control unit 11 determines whether or not the user has performed an operation for starting the laser light emission operation within a previously set time limit of the timer (step A14). When it is determined that the operation for starting the laser light emission operation has been performed within the time limit of the timer (Yes in step A14), the process returns to step A4. However, when it is determined that the operation for starting the laser light emission operation has not been performed within the time of the timer (No in step A14), the control unit 11 stops (forcibly stops) the laser pointer function (step A15), and, in step A10, the control unit 11 releases suppression of notification. Thereafter, step A11 and step A12 are performed as in the above described process.

Then, when the control unit 11 determines, in step A5, that the communication operation or the alarm operation corresponds to the specific condition (Yes in step A5), the control unit 11 stops the laser light emission operation and stops (forcibly stops) the laser pointer function (step A16) and releases suppression of notification (step A17), and the occurrence of the communication operation or the alarm operation that corresponds to the specific condition is notified through the main display unit 14, the vibration motor 17, the LED 18, the speaker 19, and the sub display unit 25 (step A18). For example, a ring tone previously set by the user is notified through the speaker 19. Thereafter, the control unit 11 determines whether or not there is stored in the storage unit 15 information, which represents that the communication operation or the alarm operation that does not correspond to the specific condition has been performed (step A11). When it is determined that there is stored information (Yes in step A11), notification of the stored information is performed by the main display unit 14, the vibration motor 17, the LED 18, the speaker 19, and the sub display unit 25 (step A12). When it is determined that there is no stored information (No in step A11), the process is finished as is.

According to the mobile telephone 1 of the present embodiment having the above described configuration, when the laser pointer function that enables the laser light emission operation by the light emission unit 16 is activated by the user's operation, notification through the main display unit 14, the vibration motor 17, the LED 18, the speaker 19, and the sub display unit 25 is suppressed by the suppression unit 24, and thereafter the laser light emission operation starts by the user's operation. As a result, when the laser light emission operation is being performed, it is possible to suppress the situation in which light is emitted in an unexpected direction when the user notices a call reception, a mail reception, or the like and suddenly moves the mobile telephone 1.

Further, according to the present embodiment, if there is stored, in the storage unit 15, information which relates to the case where the communication operation or the alarm operation that does not correspond to the specific condition has been performed, after the laser pointer function is terminated by the control unit 11, notification of the information is performed by the main display unit 14, the vibration motor 17, the LED 18, the speaker 19, and the sub display unit 25. As a result, the user can recognize that there has been performed the communication operation or the alarm operation, which does not correspond to the specific condition and which was suppressed since the laser pointer function was being performed.

Further, according to the present embodiment, when the control unit 11 determines that the communication operation or the alarm operation corresponds to the specific condition, the control unit 11 stops the laser pointer function, and suppression of notification by the suppression unit 24 is released, and then notification of the communication operation or the alarm operation that corresponds to the specific condition is performed. As a result, even when the laser light emission operation is being performed, the user can at least confirm the communication operation or the alarm operation that corresponds to the specific condition.

The exemplary embodiment has been described above, but the present invention is not limited to the first embodiment and can be implemented by various embodiments. For example, in the present embodiment, the mobile telephone 1 has been described as the portable electronic device, but the present invention is not limited thereto. The portable electronic device may include other devices that emit light, such as a PHS (a registered trademark; Personal Handy phone System), a PDA (Personal Digital Assistance), a laser pointer, and a projector.

Further, the present embodiment has been described in connection with the mobile phone 1 that is foldable through the connection unit 4, but the present invention is not limited to the folder type. There may be used a slide type in which one case slides in one direction in a state where the display unit side case 3 is superimposed on the operation unit side case 2, a rotary (turn) type in which one case rotates on en axis line in an superimposition direction of the display unit side case 3 and the operation unit side case 2, or a type (straight type) in which the operation unit side case 2 and the display unit side case 3 are arranged on one case without the connection unit. Further, the mobile telephone 1 may have a 2-axis hinge type that is openable and rotatable.

Further, in the present embodiment, the light emission unit 16 is installed in the display unit side case 3. However, the light emission unit 16 may be installed in the operation unit side case 2. Light emitted from the light emission unit 16 is laser light, but the present invention is not limited thereto. For example, light emitted from the camera light 27, light (image) emitted from the projector, or any other light may be used.

Further, in the present embodiment, notification by the main display unit 14, the vibration motor 17, the LED 18, the speaker 19, and the sub display unit 25 is all suppressed by the suppression unit 24, but the present invention is not limited thereto. Notification by lighting-up of the LED 18 may be performed, whereas notification by the main display unit 14, the vibration motor 17, the speaker 19, and the sub display unit 25 may be suppressed. That is, a manner of performing suppression of notification through the suppression unit 24 is arbitrary.

Further, in the present embodiment, suppression of notification is performed by the suppression unit 24 before the user performs the operation for starting the laser light emission operation (at the time of activation of the laser pointer function), but the present invention is not limited thereto. Suppression of notification may be performed at the same time when laser light is emitted. That is, it is preferable that suppression of notification is performed by the suppression unit 24 when the laser light emission operation is being performed.

Further, in the present embodiment, the specific condition related to the communication operation or the alarm operation includes the case in which a call is received through the communication unit 12 from a specific telephone number that is previously stored in the storage unit 15 by the user, the case in which the control unit 11 determines that a character such as "urgent" or "confirmation required" is included in the title or the text of the received mail, or the case in which the alarm operation that the user has previously stored as an operation to be performed in priority to suppression of notification in the storage unit 15 has been performed. However, the present invention is not limited thereto, and there may be included any other condition such as a case in which a mail is received, from a mail address previously stored in the storage unit 15 similarly to the case of the telephone number or a case in which breaking news on earthquake is received.

Further, in the present embodiment, after the user performs the operation for terminating the laser pointer function, suppression of notification by the suppression unit 24 is released, and then notification is performed. However, the present invention is not limited thereto. When the user performs the operation for stopping the laser light emission operation, suppression of notification may be released, and then notification may be performed. Alternatively, notification may be immediately performed without releasing suppression of notification.

Further, in the present embodiment, in step A7, the control unit 11 determines whether or not the user has performed the operation for stopping the laser light emission operation, but the present invention is not limited thereto, and the control unit 11 may determine whether or not intensity of laser light is lower than predetermined intensity.

Furthermore, in the present embodiment, notification is performed by all of the main display unit 14, the vibration motor 17, the LED 18, the speaker 19, and the sub display unit 25, but the present invention is not limited thereto, and notification may be performed by at least one of them.

Next, the mobile telephone 1 according to the second embodiment of the present invention will be described. A description will be made below focusing on points different from the mobile telephone 1 of the first embodiment, and the other descriptions will not be repeated.

In the second embodiment, when the laser light emission operation by the light emission unit 16 is being performed by the control unit 11, the communication operation by the communication unit 12 can be suppressed by the suppression unit 24. Specifically, the suppression unit 24 transmits a signal for stopping the communication operation to the communication unit 12. Thus, information related to the communication operation is accumulated in a base station and does not reach the mobile telephone 1. The control unit 11 can release suppression of the communication operation by the suppression unit 24. Specifically, the control unit 11 releases suppression of the communication operation by stopping the suppression unit 24 from transmitting the signal for stopping the communication operation to the communication unit 12.

Through the above configuration, it is possible to further suppress the situation in which light gets into the user's eye or the audience's eye when the user notices the notification and suddenly moves the mobile telephone 1.

A specific operation will be described below with reference to FIG. 5. FIG. 5 is a flowchart for explaining an operation example of the mobile telephone 1 according to the second embodiment.

First, when the control unit 11 detects that the user has performed an operation for activating the laser pointer function on the operation unit 13, the control unit activates the laser pointer function that enables the laser light emission operation by the light emission unit 16 (step B1). The suppression unit 24 suppresses the communication operation by the communication unit 12 (step B2). Then, when the control unit 11 detects that the user has performed an operation for starting the laser light emission operation on the operation unit 13, the control unit 11 starts the laser light emission operation (step B3).

Thereafter, the control unit 11 determines whether or not the user has performed an operation for stopping the laser light emission, operation on the operation unit 13 (step B4). When it is determined that the operation for stopping the laser light emission operation has not been performed (No in step B4), the process returns to step B4, and step B4 is repeated. Meanwhile, when it is determined that the operation for stopping the laser light emission operation has been performed (Yes in step B4), the control unit 11 determines whether or not the user has performed an operation for terminating the laser pointer function on the operation unit 13 (step B5).

When it is determined that the operation for terminating the laser pointer function has been performed (Yes in step B5), the control unit 11 terminates the laser pointer function (step B7). Then, the control unit 11 releases suppression of communication operation (step B7). Further, the communication unit 12 performs communication with the base station in order to confirm whether or not information related to the communication operation for the mobile telephone 1 has been accumulated in the base station while the communication operation is being suppressed by the suppression unit 24 (step B8).

Here, after the control unit 11 determines that the user has performed the operation for stopping the laser light emission operation on the operation unit 13 (Yes in step B4), when the control unit 11 determines that the user has not performed the operation for terminating the laser pointer function on the operation unit 13 (No in step B5), the control unit 11 activates the timer 22 (step B9). The control unit 11 determines whether or not the user has performed an operation for starting the laser light emission operation within a time limit of the timer (step B10). When it is determined that the operation for starting the laser light emission operation has been performed within the time limit of the timer (Yes in step B10), the process returns to step B4. However, when it is determined that the operation for starting the laser light emission operation has not been performed within the time limit of the timer (No in step B10), the control unit 11 stops (forcibly stops) the laser pointer function (step B11), and, in step B7, suppression of the communication operation is released. Thereafter, step B8 is performed as in the above described process.

According to the mobile telephone 1 of the present embodiment having the above described configuration, when the laser pointer function that enables the laser light emission operation by the light emission unit 16 is activated by the user's operation, the communication operation by the communication unit 12 is suppressed by the suppression unit 24, and thereafter the laser light emission operation starts by the user's operation. As a result, when the laser light emission operation is being performed, it is possible to further suppress the situation in which light is emitted in an unexpected direction when the user suddenly moves the mobile telephone 1.

The mobile telephone 1 of the second embodiment cannot perform communication with the base station while the communication operation by the communication unit 12 is being suppressed by the suppression unit 24, but the alarm operation unit can operate independently of the communication unit 12. Even though not shown in FIG. 5, similarly to the first embodiment, the mobile telephone 1 may be configured such that when the alarm operation that does not correspond to the specific condition, is performed, information relevant thereto is stored, and when the alarm operation that corresponds to the specific condition is performed, the alarm operation is notified by lighting-up of the LED 18 or the like. Alternatively, after notification is performed, the laser pointer function may be stopped, suppression of the communication operation by the suppression unit 24 may be released, and communication with the base station may be performed.

The exemplary embodiment has been described above, but, as in the first embodiment, the present invention is not limited to the second embodiment and can be implemented by various embodiments.

Next, the mobile telephone 1 according to a third embodiment of the present invention will be described. In the third embodiment, the portable electronic device according to the present invention is a mobile telephone 1 with a projector function that projects a picture (that is, projects an image) by emitting light through the light emission unit 16. The mobile telephone 1 of the third embodiment will be described below focusing on points different from the mobile telephone 1 of the first embodiment, and the other descriptions will not be repeated.

In the third embodiment, the mobile telephone 1 is configured such that when the light emission operation by the light emission unit 16 is being performed by the control unit 11, movement of the mobile telephone 1 is detected by the acceleration sensor 28, and the notification operation by the main display unit 14, the vibration motor 17, the LSD 18, the speaker 19, and the sub display unit 25 is suppressed according to the result. As a result, the following effect is obtained. That is, if moving of the mobile telephone 1 is detected by the acceleration sensor 28, a scene in which the user holds the mobile telephone 1 in his/her hand and is performing the light, emission operation may be considered. Meanwhile, when the mobile telephone 1 that remains stationary is detected by the acceleration sensor 28, there is a possibility that the light emission operation is being performed in a state in which the user does not hold the telephone 1 in his/her hand, for example, a state in which the mobile telephone 1 is placed on a placement target surface.

In this case, according to the detection result of the acceleration sensor 28, suppression of notification is performed when it is believed that there is a relatively low possibility that light will be emitted in an unexpected direction (moving of the mobile telephone 1 is detected by the acceleration sensor 28), whereas suppression of notification is released when it is believed that there is a relatively low possibility that light will be emitted in an unexpected direction (the mobile telephone 1 that remains stationary is detected). Therefore, it is possible not only to suppress light from being emitted in an unexpected direction but also to perform notification, and thus an effect of improving convenience of the mobile telephone 1 is obtained.

Figure 6:
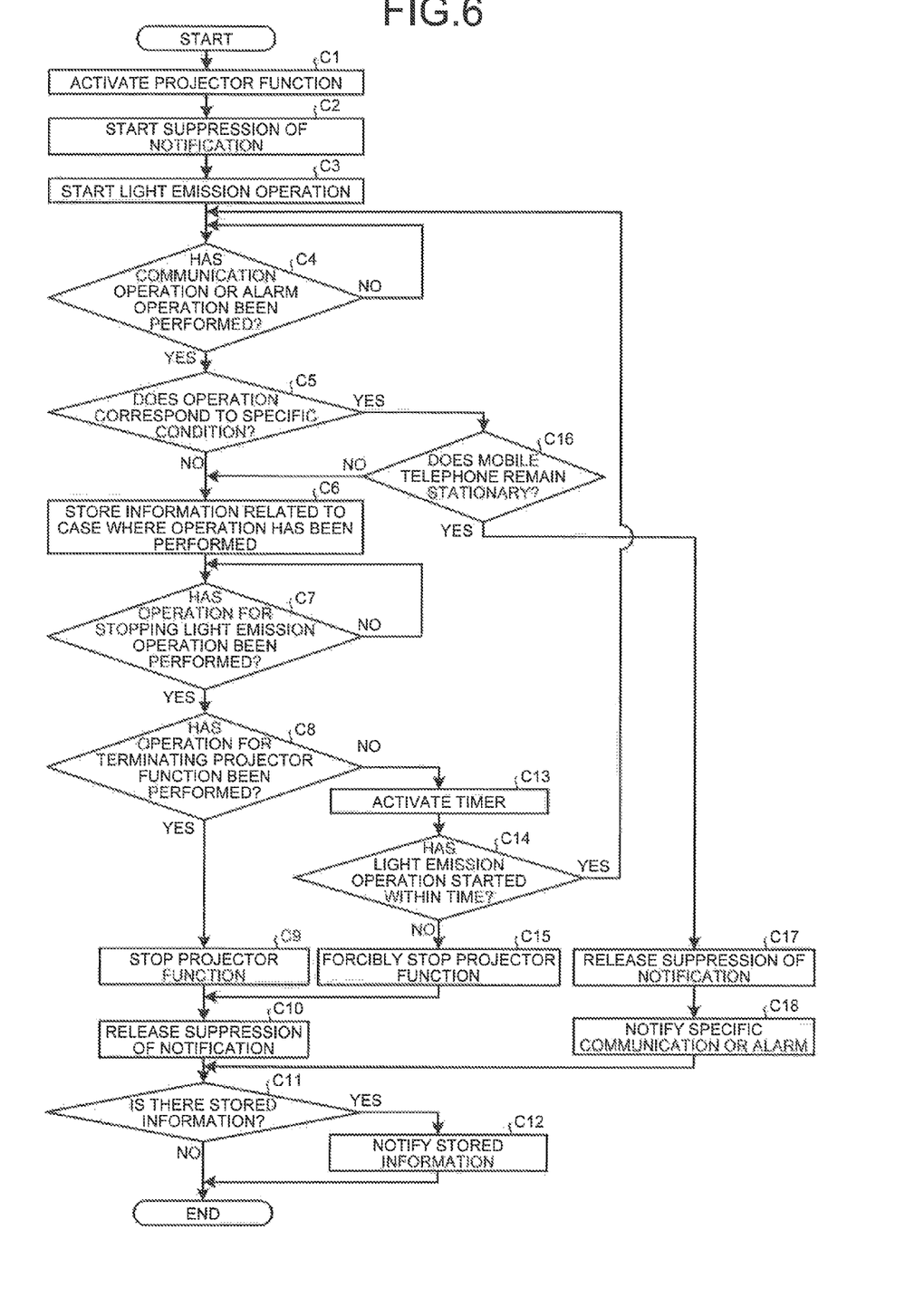
FIG. 6 is a flowchart showing an operation example according to a third embodiment of the present invention.

A specific operation will be described below with reference to FIG. 6. FIG. 6 is a flowchart for explaining an operation example of the mobile telephone 1 according to the third embodiment. First, when the control unit 11 detects that the user has performed an operation for activating a projector function on the operation unit 13, the control unit activates the projector function that enables the light emission operation by the light emission unit 16 (step C1). The suppression unit 24 suppresses notification by the main display unit 14, the vibration motor 17, the LED 18, the speaker 19, and the sub display unit 25 (step C2). Then, when the control unit 11 detects that the user has performed an operation for starting the light emission operation on the operation unit 13, the control unit 11 starts the light emission operation (step C3).

Thereafter, the control unit 11 determines whether or not the communication operation by the communication unit 12 or the alarm operation by the alarm operation unit 23 has been performed by the main display unit 14, the vibration motor 17, the LED 18, the speaker 19, and the sub display unit 25, based on the transmitted signal for instructing notification (step C4). When it is determined that the communication operation or the alarm operation has been performed (Yes in step C4), the control unit 11 determines whether or not the communication operation or the alarm operation corresponds to a specific condition which will be described later (step C5). Meanwhile, when it is determined that the communication operation or the alarm operation has not been performed (No in step C4), the process returns to step C4, and step C4 is repeated. For example, case that corresponds to the specific condition refers to a case in which the communication unit receives a call from a specific telephone number that is selected from data of the address book inside the storage unit 15 and stored in the storage unit 15 by the user, a case in which the control unit 11 determines that a specific character (signal) such as "urgent" or "confirmation required" is included in the title or the text of a received mail, or a case in which the alarm operation where the user has previously stored "performing in priority to suppression of notification" in the storage unit 15 has been performed.

When the control unit 11 determines that the communication operation or the alarm operation does not correspond to the specific condition (when a call is received from a correspondent other than a specific correspondent, when a specific signal is not included in a received call, or when an alarm operation other than a specific alarm operation is performed) (No in step C5), there is stored, in the storage unit 15, information related to the case where the communication operation or the alarm operation that is the basis of notification has been performed (step C6). A subsequent process is the same as in the first embodiment.

Then, when the control unit 11 determines, in step C5, that the communication operation or the alarm operation corresponds to the specific condition (Yes in step C5), the control unit 11 determines whether or not the mobile telephone 1 remains stationary, based on a detection value of the acceleration sensor 28 (step C16). When it is determined that the mobile telephone 1 remains stationary (Yes in step C16), the control unit 11 releases suppression of notification (step C17), and the occurrence of the communication operation or the alarm operation that corresponds to the specific condition is notified by the main display unit 14, the vibration motor 17, the LED 18, the speaker 19, and the sub display unit 25 (step C18). After notification is performed, the process proceeds step C11. A subsequent process is the same as the process subsequent to step A11 in the first embodiment.

Meanwhile, when it is determined that the mobile telephone 1 does not remain stationary (is moving) (step C16), the process proceeds to step C6, and there is stored, in the storage unit 15, information related to the case where the communication operation or the alarm operation that is the basis of notification has been performed. A subsequent process is the same as in the first embodiment. In this case, in step C9, notification is not performed until the user performs an operation for stopping the projector function. That is, when the light emission operation is being performed by the control unit 11, if it is not detected that the mobile telephone 1 remains stationary, notification is suppressed.

The exemplary embodiment has been described above, but it is the same as in the first and second embodiments that the present invention is not limited to the third embodiment and can be implemented by various embodiments. For example, in the third embodiment, the acceleration sensor has been described as the case state detection unit, but the present invention is not limited thereto. If moving of the portable electronic device can be detected, any other sensor such as an illuminance sensor, a geomagnetic sensor, an atmospheric pressure sensor can be used. Further, a case state is not limited to movement based on acceleration as in the third embodiment. Whether or not it is placed on a battery charger may be detected as the case state, and when it is detected that it is not placed on the battery charger, notification may be suppressed.

In the present invention, in the first embodiment, in the case of No in step A5, notification may be suppressed. In the second embodiment, after step B3, communication may be suppressed. Further, in the third embodiment, in the case of No in step C16, not may be suppressed.

Further, suppression of not in the present invention is not limited to the above described configuration but may include a configuration based on a similar technical spirit. For example, the control unit may first determine whether or not an event in which notification by the call reception, the alarm operation, or the like is performed has occurred. When the control unit determines that the event has occurred, the control unit determines whether or not the light emission operation by the light emission unit is being performed. When it is determined that the light emission operation is being performed, notification by the occurrence of the event is suppressed. By performing such a series of processes, the same effect as in the above described embodiments can be obtained by the simple configuration. Further, even when the light emission operation is being performed, if the stationary state of the case is detected, suppression of notification may be released.

INDUSTRIAL APPLICABILITY

As described above, the portable electronic device according to the present invention is suitable for use in portable electronic devices that can emit light.

REFERENCE SIGNS LIST 1 mobile telephone
2 operation unit side case
3 display unit side case
11 control unit
12 communication unit
13 operation unit
14 display unit
15 storage unit
16 light emission unit
17 vibration motor
18 LED
19 speaker
22 timer
23 alarm operation unit
24 suppression unit
25 sub display unit
26 camera
27 camera light

The invention claimed is:

1. A portable electronic device, comprising:
a light emission unit configured to emit light;
a notification unit configured to perform a predetermined notification; and
a control unit configured to control the light emission unit to emit the light and the notification unit to perform the predetermined notification according to a predetermined condition, wherein
the control unit is configured to prevent the notification unit from performing the predetermined notification when the light emission unit is emitting the light, and
the light emission unit is a projector.

2. The portable electronic device according to claim 1, further comprising a communication unit, wherein
the control unit is configured to determine whether or not a call is received by the communication unit,
upon the control unit determining that the call is received by the communication unit, the notification unit is configured to perform the predetermined notification in response to a reception of the call, and
when the light emission unit is emitting the light, and upon the control unit determining that the call is received by the communication unit, the control unit is configured to prevent the notification unit from performing the predetermined notification in response to the reception of the call.

3. The portable electronic device according to claim 2, wherein
the control unit is further configured to determine whether or not a specific signal is included in the call received by the communication unit, and
when the light emission unit is emitting the light, upon determining that the specific signal is not included in the call received by the communication unit, the control unit is configured to prevent the notification unit from performing the predetermined notification.

4. The portable electronic device according to claim 2, wherein
the control unit is further configured to determine whether or not the call received by the communication unit is from a specific correspondent, and
when the light emission unit is emitting the light, upon determining that the call received by the communication unit is from a correspondent other than the specific correspondent, the control unit is configured to prevent the notification unit from performing the predetermined notification.

5. The portable electronic device according to claim 4, wherein
the control unit is further configured to determine whether or not a specific signal is included in the call received by the communication unit, and
when the light emission unit is emitting the light, upon determining that the specific signal is not included in the call received by the communication unit, the control unit is configured to prevent the notification unit from performing the predetermined notification.

6. The portable electronic device according to claim 1, further comprising an alarm operation unit, wherein
the control unit is further configured to determine whether or not an alarm operation has been performed by the alarm operation unit, and
when the light emission unit is emitting the light, upon determining that the alarm operation has been performed by the alarm operation unit, the control unit is configured to prevent the notification unit from performing the predetermined notification.

7. The portable electronic device according to claim 6, wherein the control unit is further configured to determine whether or not the alarm operation is a specific alarm operation, and when the light emission unit is emitting the light, upon determining that the alarm operation is other than the specific alarm operation, the control unit is configured to prevent the notification unit from performing the predetermined notification.

8. The portable electronic device according to claim 1, further comprising a storage unit, wherein upon preventing the notification unit from performing the predetermined notification, the control unit is configured to store, in the storage unit, information indicating that the predetermined condition, that is the basis of the predetermined notification, has been satisfied.

9. The portable electronic device according to claim 8, wherein when the light emission unit stops emitting the light, and when the information indicating that the predetermined condition has been satisfied is stored in the storage unit, the control unit is configured to allow the notification unit to perform the predetermined notification.

10. The portable electronic device according to claim 1, further comprising:

a case; and a case state detection unit configured to detect a state of the case, wherein when the light emission unit is emitting the light, upon the case state detection unit determining that the state of the case is a predetermined state, the control unit is configured to prevent the notification unit from performing the predetermined notification.

11. The portable electronic device according to claim 1, wherein the notification unit is at least one selected from the group consisting of a vibration motor, a light emitting diode other than a light source of the projector, and a speaker.

12. The portable electronic device according to claim 1, wherein the notification unit is at least one selected from the group consisting of a vibration motor, a light emitting diode, and a speaker.

13. The portable electronic device according to claim 1, wherein the notification unit is arranged separately from the light emission unit, and the control unit is configured to prevent, upon beginning of emission of the light from the light emission unit, the notification unit from performing the predetermined notification during the emission of the light, and cause, upon ending of the emission of the light, the notification unit to perform the predetermined notification that has been prevented during the emission of the light.

14. A portable electronic device, comprising:

a light emission unit configured to emit light;

a communication unit; and a control unit configured to control the light emission unit to emit the light and the communication unit to perform a communication operation, wherein the control unit is configured to prevent the communication unit from performing the communication operation when the light emission unit is emitting the light, and the light emission unit is a projector.

15. The portable electronic device according to claim 14, wherein the notification unit is at least one selected from the group consisting of a vibration motor, a light emitting diode other than a light source of the projector, and a speaker.

16. The portable electronic device according to claim 14, wherein the notification unit is at least one selected from the group consisting of a vibration motor, a light emitting diode, and a speaker.

17. The portable electronic device according to claim 14, wherein the communication unit is configured to communicate with a base station, and the control unit is configured to prevent the communication unit from performing a communication with the base station during emission of the light from the light emission unit, to prevent a notification accompanied by the communication, and cause, upon ending of the emission of the light, the communication unit to perform the communication with the base station, to check whether there was an incoming call to the portable electronic device while the communication unit was being prevented from performing the communication.

18. A portable electronic device, comprising:

a light emission unit configured to emit light;

a notification unit configured to perform a predetermined notification;

a control unit configured to control the light emission unit to emit the light and the notification unit to perform the predetermined notification according to a predetermined condition; and a communication unit, wherein the control unit is configured to determine whether or not a call is received by the communication unit, upon the control unit determining that the call is received by the communication unit, the notification unit is configured to perform the predetermined notification in response to a reception of the call, and when the light emission unit is emitting the light, and upon the control unit determining that the call is received by the communication unit, the control unit is configured to prevent the notification unit from performing the predetermined notification in response to the reception of the call.

19. A portable electronic device, comprising:

a light emission unit configured to emit light;

a communication unit; and a control unit configured to control the light emission unit to emit the light and the communication unit to perform a communication operation, wherein the control unit is configured to determine whether or not a call is received by the communication unit, and when the light emission unit is emitting the light, and upon the control unit determining that the call is received by the communication unit, the control unit is configured to prevent the communication unit from performing the communication operation.

* * * * *